(12) United States Patent
Brown

(10) Patent No.: US 11,256,479 B2
(45) Date of Patent: Feb. 22, 2022

(54) DYNAMIC UPDATES IN AN INTERACTIVE PROGRAMMING ENVIRONMENT

(71) Applicant: Apple Inc., Cupertino, CA (US)

(72) Inventor: Alexander B. Brown, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/855,067

(22) Filed: Apr. 22, 2020

(65) Prior Publication Data

US 2020/0341736 A1    Oct. 29, 2020

Related U.S. Application Data

(60) Provisional application No. 62/840,199, filed on Apr. 29, 2019.

(51) Int. Cl.
| | |
|---|---|
| *G06F 9/44* | (2018.01) |
| *G06F 9/455* | (2018.01) |
| *G06F 9/445* | (2018.01) |
| *G06F 8/30* | (2018.01) |
| *G06F 8/41* | (2018.01) |

(52) U.S. Cl.
CPC . *G06F 8/30* (2013.01); *G06F 8/41* (2013.01)

(58) Field of Classification Search
CPC .................................... G06F 8/30; G06F 8/41
See application file for complete search history.

(56) References Cited

U.S. PATENT DOCUMENTS

| | | | |
|---|---|---|---|
| 10,255,045 B2 | 4/2019 | Drukman et al. | |
| 2011/0258600 A1* | 10/2011 | Osenkov | G06F 11/3684 717/124 |
| 2013/0024837 A1* | 1/2013 | Bienkowski | G06F 11/3664 717/109 |
| 2013/0055223 A1* | 2/2013 | Xu | G06F 8/427 717/143 |
| 2013/0080506 A1* | 3/2013 | Ng | G06F 11/3664 709/203 |
| 2015/0058943 A1* | 2/2015 | Morita | G06F 21/71 726/6 |

(Continued)

OTHER PUBLICATIONS

Henry Fellows, Developing Beginner-Friendly User Interactions for the Clojure Programming Language, 2015, pp. 1-14. http://cda.mrs.umn.edu/~elenam/publications/mics2015.pdf (Year: 2015).*

(Continued)

*Primary Examiner* — Mongbao Nguyen
(74) *Attorney, Agent, or Firm* — Womble Bond Dickinson (US) LLP

(57) ABSTRACT

An interactive software development environment in one embodiment can interactively provide outputs of execution or evaluation of software entered into the environment prior to compilation of the software and can automatically add one or more error handling expressions that isolate errors from effecting future software. The environment can automatically add the one or more error handling expressions for each line for software or for a set of software to wrap the set to catch and isolate errors. The execution or evaluation of software in the environment can be, for example, by read-evaluate-print-loop functionality provided by the environment.

18 Claims, 7 Drawing Sheets

(56) References Cited

U.S. PATENT DOCUMENTS

| | | | |
|---|---|---|---|
| 2018/0218046 A1* | 8/2018 | Woo | G06F 16/248 |
| 2018/0267783 A1* | 9/2018 | Kawaguchi | G06F 8/4435 |
| 2019/0278569 A1* | 9/2019 | Horton | G06F 8/41 |
| 2020/0097389 A1* | 3/2020 | Smith | G06F 11/0775 |

OTHER PUBLICATIONS

Nicolás Passerini, Wollok: language + IDE for a gentle and industry-aware introduction to OOP, 2017, pp. 1-4. https://ieeexplore.ieee.org/stamp/stamp.jsp?tp=&arnumber=8120933&isnumber=8120877 (Year: 2017).*

Makarius Wenzel, Read-Eval-Print in Parallel and Asynchronous Proof-checking, 2013, pp. 57-70. https://arxiv.org/pdf/1307.1944.pdf (Year: 2013).*

Ben's Blog, reple: "Replay-Based" REPLs for Compiled Languages, 2018, pp. 1-4. https://people.eecs.berkeley.edu/~brock/blog/reple.php (Year: 2018).*

* cited by examiner

```
                                    ← 201
                203                                              205
          entered source code                                   results S1      let x = 1                                            1

S2      let y = x + 2                                        3

S3      let z = y + 100                                    103
``` error handling expressions added before 1st evaluation of S2 in REPL environment :
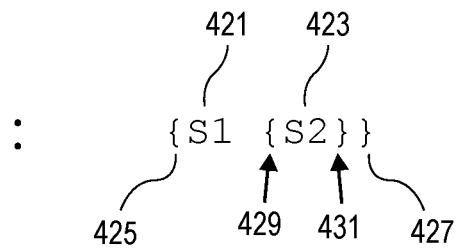
S2 fails and then S3 is added :
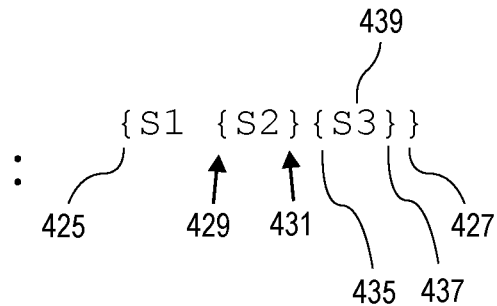
S2 succeeds (no errors) and then S3 is added :
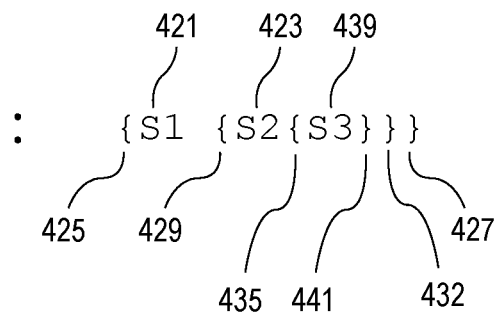
FIG. 4B

```
       ┌─461         ┌─463                    ┌─465
line           Code                        result
 S1      let a = 1                            1
 S2      let b = 2                            2
 S3      let x = a + b   ┌─467                3    ┌─469
 S4      let y = x + fail                   error
 S5      let m = 2x  ◄─
                     471                       6
```

```
enum Fail:Error {
    case fail;
} func fail() throws -> Int { throw Fail.fail }

// ....

let x = 1 let y = try 2 * x * fail()

let z = 3 * x
```

FIG. 4E

```
enum Fail:Error {
    case fail;
} func fail() throws -> Int { throw Fail.fail }

// ....

let x = 1
do {
    let y = try 2 * x * fail()
} catch {
} let z = 3 * x
```

FIG. 4F

DYNAMIC UPDATES IN AN INTERACTIVE PROGRAMMING ENVIRONMENT

This application claims the benefit of U.S. Provisional Patent Application No. 62/840,199, filed on Apr. 29, 2019, which application is incorporated herein by reference.

BACKGROUND

Many modern programming languages require advanced editing and compiling software in order to edit, debug, and compile source code. In some development environments, a software developer generally engages in several manual steps before testing new code. For example, in a typical development lifecycle, source code must be separately edited, compiled, and executed before debugging can commence. To enhance the task of software development, software developers can develop software applications using an integrated development environment. An integrated development environment (IDE) is a software application that usually includes a source code editor, a compiler and/or interpreter, build automation tools, and a debugger. Examples of integrated development environments include Xcode from Apple Inc. of Cupertino Calif. and Visual Studio from Microsoft Corporation of Redmond, Wash. The editor of an integrated development environment can include features that facilitate moving between files and accessing related reference materials such as an application programming interface (API) definition. The source code editor of the integrated development environment can also include features that facilitate viewing and editing text data such as source code or XML and checking the text data.

In the case of Xcode, a computer programmer can enter source code into the source code editor and then submit the source code to a compiler and then the compiler can display results of the output of the compiled and then executed computer program, and these results can be displayed in the integrated development environment. For example, these results can be displayed in a region of the source code editor.

Some software development tools also provide for outputs on a statement by statement basis. For example, some software development tools provide read-evaluate-print-loop (REPL) functionality that evaluates each line of software after the line is entered by the programmer. REPL functionality provides, prior to compilation of the software, a display of results of a statement in the source code by evaluating the statement and executing the statement and then printing (e.g., displaying) the result of the execution of the statement. This can allow the programmer to determine if the statement is generating the expected or desired result. The Basic interpreter is an example of a software development tool that provides REPL functionality. REPL functionality makes the software development environment interactive because the programmer can enter program code and immediately see the results and then revise the program code and immediately see the results of the revisions. REPL software development environments are prone to failures when new software contains flaws that cause a termination of the REPL coding session. For example, consider a case where a first line of code entered in the REPL coding environment contains no flaws and is evaluated to provide results before compilation and produces a set of saved states which can be used for subsequently entered software in the REPL software development environment. Normally, subsequently entered software in the REPL software development environment will generate additional saved states based on the previously saved states if there are no errors in the subsequently entered software. If a second line of code, which is subsequent code, contains flaws or errors which prevent the evaluation of the newly entered code, the REPL coding session is terminated as a result of the flaws in the second line of code. Any software entered after the second line of code will not be evaluated due to the failure to evaluate the second line of code. Thus the REPL session is terminated and all of the code in the session must be re-entered again.

SUMMARY OF THE DESCRIPTION

An interactive software development environment in one embodiment can interactively provide outputs of execution or evaluation, such as read-evaluate-print-loop (REPL) evaluations of software, such as software in source code form, entered into the environment prior to compilation of the software and can automatically add one or more error handling expressions that isolate errors from affecting subsequently entered software. In one embodiment, a method can include the following operations: receiving a first set of software in an interactive software development environment, the interactive software development environment providing a representation of one or more outputs for one or more portions, such as one or more lines, in the first set of software entered into the interactive software development environment, the representation of the one or more outputs provided in response to entry of the one or more portions in the first set of software that can be evaluated to produce a result; saving first state information derived from evaluation of the first set of software in the interactive software development environment; receiving a second set of software in the interactive software development environment, the second set of software received after receipt of the first set of software; adding one or more error handling expressions to the second set of software to isolate error conditions produced when executing the second set of software, the one or more error handling expressions added automatically by the interactive software development environment without requiring the user to add the error handling expressions and the error handling expressions added prior to the first execution of the second set of software in the interactive software development environment. In one embodiment, the error handling expressions can wrap the second set of software to isolate error conditions (in the second set of software) from affecting subsequently added software in the development environment. The subsequently added set of software (added after the second set of software) is isolated from the programmatic context of the isolated second set of software by the automatically added error handling expressions in the event that the second set of software fails to execute successfully. In one embodiment, the subsequently added set of software executes using the programmatic context of previous successfully executed sets of software but not using the programmatic context of those sets of software that were not successfully executed because of errors produced by those sets of software. Thus, for sets of software that do not produce errors, the subsequently added software executes using their programmatic contexts while the subsequently added software does not use the programmatic contexts of the prior sets of software that produce error conditions when executed.

In one embodiment, the method can further include attempting, by the interactive software development environment, evaluation of the second set of software after the addition of the error handling expressions. In one embodiment, the method can further include: receiving, by the interactive software development environment, a third set of software after the attempted evaluation of the second set of software and evaluating the third set of software using the saved first state even if error conditions occurred during the attempted evaluation of the second set of software. In one embodiment, the error conditions produced by the second set of software do not affect the evaluation of the third set of software that uses only the saved first state. In one embodiment, the method can further include adding error handling expression(s) to the first set of software to isolate error conditions when executing the first set of software, the error handling expressions being added automatically by the interactive software development environment prior to first execution of the first set of software in the interactive software development environment. In one embodiment, the interactive software development environment can provide the representation of the one or more outputs before compilation of the software entered into the interactive software development environment. In one embodiment, this representation can be provided through REPL operations provided by the REPL functionality within the interactive software development environment.

In one embodiment, the one or more error handling expressions are added for each line (or set of lines that constitute an executable statement in the REPL environment) of software as it is entered into the interactive software development environment; in another embodiment, the one or more error handling expressions can be added for only selected lines of software as they are entered into the interactive software development environment. For example certain lines of software, having a low likelihood of error, may be entered without the addition of automatically added error handling software whereas other lines of software having a much higher likelihood of error can be wrapped with error handling expressions to prevent errors in the attempted evaluation of the newly added software from affecting evaluation of future software entered subsequently in the REPL environment or session. In one embodiment, the error handling expressions are not compiled when the software entered into the interactive software development environment is compiled.

The embodiments and systems described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory such as volatile DRAM.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The embodiments are illustrated by way of example, and not limitation, in the figures of the accompanying drawings in which references with like numbers indicate similar elements.

FIG. 4B shows an example of how error handling expressions are added and used in an integrated software development environment according to one embodiment.

FIG. 4E shows another example of a sequence of software statements entered into a software development environment.

FIG. 4F shows an example of how error handling expressions, which were added to isolate errors from effecting subsequently added software statements, can be displayed to the programmer using the software development environment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

This present application describes various embodiments in, for example, an interactive software development environment which provides for the evaluation of each statement of computer program code as each statement (e.g., line of software or multiple lines of software that define a function or other portion that can be evaluated in a REPL environment) is entered through the use of REPL operations and also can provide for compilation of the computer program code all within the same interactive software development environment. This allows for interactive development of the computer program which enables experimentation with algorithms and system provided application programming interfaces (APIs) in a software development environment. Thus, a programmer can enter software statements and see the results of evaluation/execution of those statements before committing to a compilation of the source code into object code.

Figure 1:
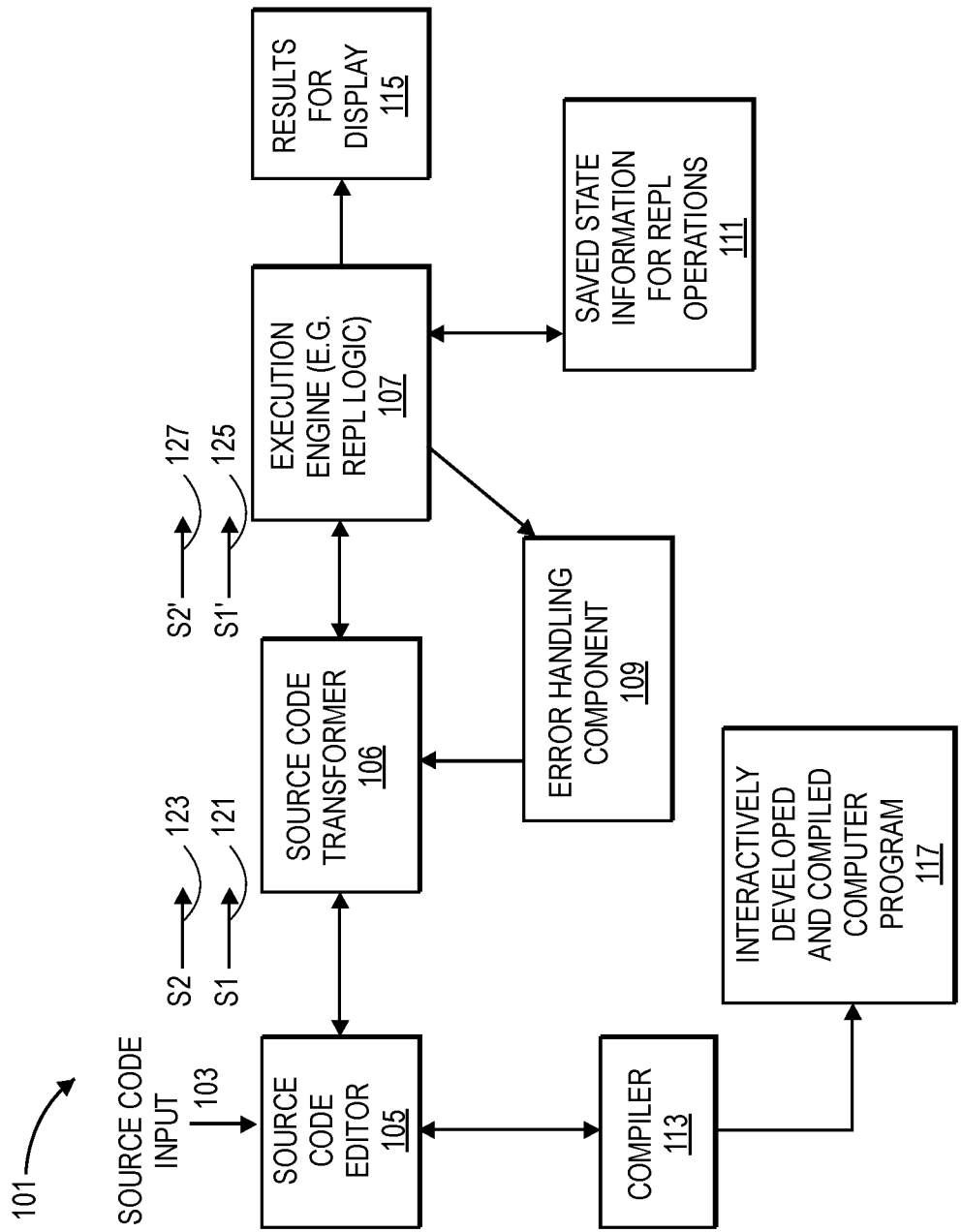
FIG. 1 is a block diagram showing an example of an interactive software development environment.
Figure 4A:
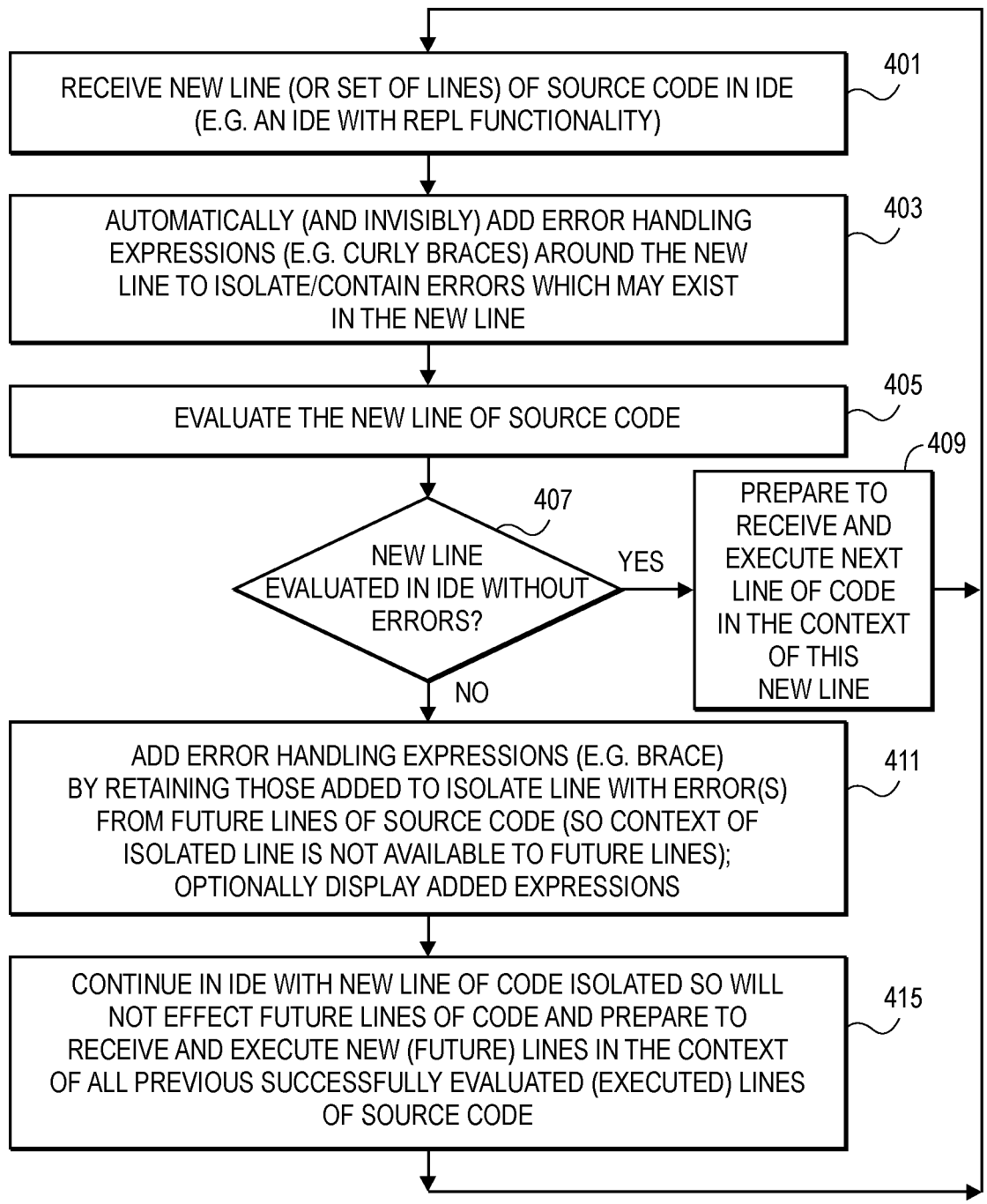
FIG. 4A is a flowchart that illustrates a method according to an embodiment described herein.

FIG. 1 shows an example of an interactive software development environment 101 which can be used to perform any one of the embodiments described herein, such as the method shown in FIG. 4A. The interactive software development environment 101 can include a compiler such that the interactive software development environment can be considered an integrated software development environment. The interactive software development environment 101 can be implemented in software which executes on a data processing system such as a computer from Apple Inc. of Cupertino Calif. The data processing system may also be a different type of computer system. The interactive software development environment 101 can be, for example, the Xcode integrated software development environment (from Apple Inc.) which provides interactive development features that software developers can use to create, execute, compile, and debug computer program software. In one or more embodiments, the interactive software development environment 101 can execute as an application process on the data processing system and is stored in memory on the data processing system in conjunction with an interactively developed computer program 117 which is being developed by using the interactive software development environment 101. In one embodiment, the interactive software development environment 101 and the interactively developed computer program 117 are both stored in memory on the data processing system, such as DRAM memory or in the virtual memory space of the data processing system. In one embodiment, the interactively developed application or computer program 117 can execute as an application process in a different memory space then the application process of the interactive software development environment 101, although in some implementations the interactively developed computer program 117 and the application process of the interactive software development environment 101 can be combined in a single process or separate processes in the same memory address space. In one embodiment, the interactive software development environment 101 can present a user interface which can include a source code editor provided by the source code editor 105. The source code editor 105 can be configured to receive source code input, such as source code input 103 from a computer programmer using the interactive software development environment 101. The source code editor 105 can provide for various functions such as spellchecking and other functions known in the art for source code editors. The Xcode interactive software development environment from Apple Inc. of Cupertino Calif. provides one example of a known user interface for entry of computer software and debugging and compilation of that software. The source code editor 105 can be coupled to one or more compilers, such as one or more compilers 113. The one or more compilers 113 can be configured to compile source code from the source code editor 105 and provide executable code such as the interactively developed computer program 117 shown in FIG. 1. When executed, the interactively developed computer program 117 can generate results for display, such as the results 115 which can be displayed in a window such as a results pane or panel of the source code editor 105. In one embodiment, the interactive software development environment 101 can dynamically compile and execute additional computer program instructions after the additional instructions are entered into the source code editor 105, enabling the interactively developed computer program 117 to be coded, executed, debugged, and re-coded in an interactive manner. In one embodiment, the one or more compilers 113 can include a front end compiler and a back end compiler. In one embodiment, the interactive software development environment 101 uses a compilation system based on the LLVM (Low Level Virtual Machine) compiler infrastructure, although other compilation systems may be used. The front end compiler in one embodiment analyzes the program code to build an internal representation or intermediate expression of the program. The back end compiler can further compile the intermediate expression or the internal representation to create an expression which is executable on a particular processing system which is one of many possible different systems with different microprocessor architectures in one embodiment. In another embodiment, the one or more compilers 113 can be a single compiler which produces executable code resulting in the interactively developed computer program 117 being stored in memory for execution at runtime. The one or more compilers 113 can also generate, in one embodiment, the saved state information for future REPL operations and store that saved state information as saved state information 111 as shown in FIG. 1. In one embodiment, the one or more compilers 113 can generate results for display, such as the results 115 which are generated as a result of compiling the computer program or performing REPL operations in one embodiment.

In one embodiment, the interactive software development environment 101 can also include an execution engine, such as REPL operation processing logic 107 which can perform REPL operations on source code received on a statement by statement basis, such as a line by line basis as each line is entered by the computer programmer hitting the enter key on a keyboard for example. In other words, as each statement or line of source code is received by the interactive software development environment 101, if the statement can be evaluated and produce a result of a REPL operation (a REPL result), the statement may be evaluated and the result may be displayed as part of the results 115 using the REPL operation processing logic 107 in one embodiment. The REPL operation processing logic 107 can be coupled to the source code editor 105 through source code transformer 106 in one embodiment to receive source code statements on a line by line basis and produce outputs that represent the outputs of a REPL operation. These outputs can be displayed (e.g. on a display device) as results 115 on a line by line basis associated with the corresponding line of source code or section of source code which produced the results from the REPL operation. The REPL operation processing logic 107 can also generate and provide the state information for each REPL operation which is produced and cause that information to be saved as state information 111 for each REPL operation. This saved information is used for subsequent REPL operations by saving variable information data, constant data information and other information used to derive values for subsequently entered source code in the REPL session or environment. In other words, the saved state information 111 can be used for subsequent REPL operations for subsequently entered source code in the REPL session so that there is no need to recompile or re-execute or reevaluate previously entered source code in the REPL environment or session. In one embodiment, the REPL operation processing logic 107 can generate the results 115 and generate the state information to be saved as part of the saved state information 111.

The source code transformer 106 in one embodiment can receive source code (software) statements as each statement is entered in the source code editor 105 and transform each of those statements, prior to execution (e.g. evaluation) by the REPL processing logic 107, by adding one or more error handling expressions to each statement. For example, the source code transformer 106 can automatically add one or more error handling expressions to each statement; this addition can occur invisibly from the programmer's perspective so the programmer does not see the addition of the one or more error handling expressions to the source code entered (e.g. typed) by the programmer. The error handling expressions can isolate a statement that causes one or more errors by isolating the context of that error causing statement from the contexts of subsequently added statements. The error handling expressions are described further below and can include existing expressions in a programming language that can limit the scope or context of a statement so that subsequently added statements do not have access to the statement and hence errors caused by the statement can be isolated from the subsequently added statements.

Figures 2, 3:
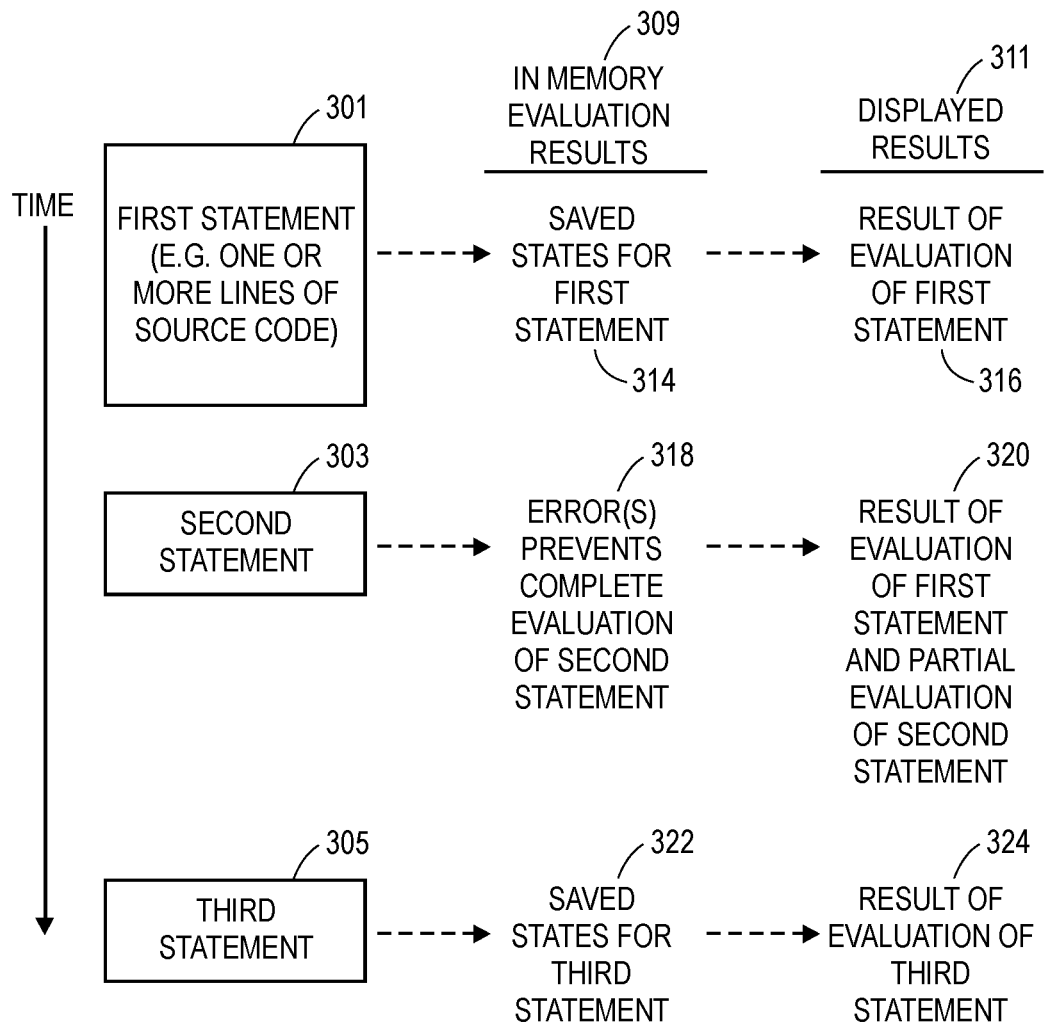
FIG. 2 shows a simplified user interface of an interactive software development environment according to one embodiment described herein.
FIG. 3 shows an example of the use of an interactive software development environment as new software lines are added according to one embodiment described herein.
Figures 4C, 4D:
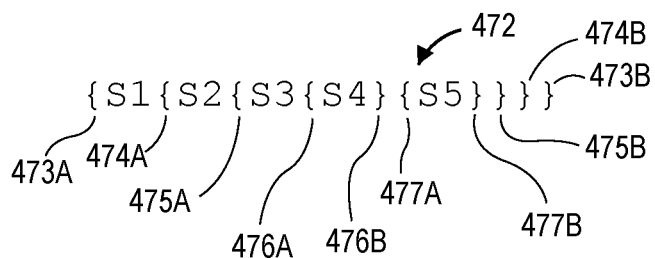
FIG. 4C shows an example of a sequence of software statements added over time into a software development environment and the resulting sequence of outputs (results) from the REPL processing logic of the software development environment.
FIG. 4D shows an example of how error handling expressions can be added to control the programmatic context of the software statements in FIG. 4C to isolate the error conditions in one statement from effecting the evaluation of subsequent software statements in the software development environment.

As shown in the example of FIG. 1, a statement 121 (statement S1) is received from the source code editor 105 by the source code transformer 106 which then transforms statement S1 into statement 125 (statement S1') by adding one or more error handling expressions. The source code transformer 106 provides the statement 125 to the REPL processing logic 107 which evaluates the statement 125 and provides an output for display in results 115 if the statement is successfully executed. The results of states for statement 125 can be saved in saved state information 111. The next statement following statement 121 is statement 123 (statement S2), which is provided to the source code transformer 106 once statement 123 is entered by the programmer. The source code transformer 106 then transforms statement 123 by adding one or more error handling expressions to statement 123 to create statement 127 (statement S2) which is provided to the REPL processing logic 107 for execution (e.g. REPL evaluation), and if execution is successful the results of the execution of statement 127 can be displayed in results 115 (and state information after execution of statement 127 can be stored in saved state information 111). If statement 127 produces an error when its execution is attempted by the REPL processing logic 107, the REPL processing logic 107 can notify the error handling component 109 about the error caused by statement 127. Then the error handling component 109 can notify the source code transformer 106 about the error caused by statement 127 and cause the source code transformer 106 to cause the modification of the source code in the source code editor by adding the one or more error handling expressions to statement S2 in the source code being processed by source code editor 105. In one embodiment, the source code editor 105 displays the added one or more error handling expressions in the source code displayed by the source code editor so the programmer can see the addition of these expressions which were not added by the programmer. The display of these expressions can help the programmer in debugging and correcting the errors. These added error handling expressions for statement S2 also can isolate the context of statement S2 from subsequently added statements (e.g. S3, S4, etc.) so that these subsequently added statements do not have access to the context of statement S2 and hence may still be evaluated successfully in many cases in the REPL environment. Moreover, the added error handling expressions can allow the REPL session to continue without being terminated by the error in statement S2 and allow the evaluation of the subsequently added statements. FIGS. 3 and 4C show examples of how REPL sessions can successfully continue after an error inducing statement is evaluated in the REPL environment.

In one embodiment, the one or more error handling expressions are added automatically (and invisibly) by the interactive software development environment 101 without any interaction or input by the programmer and they are added prior to execution of each new line of software added by the programmer without requiring the programmer to instruct the interactive software environment 101 to add the error handling expressions. In one embodiment, the source code transformer 106 and the error handling component 109 operate within the REPL session or environment in order to provide for safe execution of error-causing statements so that previously entered source code in the REPL session or environment is preserved to the extent that the source code output from the previously entered source code is not adversely affected by errors from subsequently entered source code and also so that subsequently entered source code (entered after the error causing statement) is isolated from the context of the error causing statement.

In one embodiment, the software development environment 101 can add error handling software for each and every line of software as it is entered into the interactive software development environment; in another embodiment, the software development environment 101 can add error handling software only for selected lines of software as they are entered into the interactive software development environment, where the selected lines are selected based upon a likelihood of error. Software statements or lines of software which are more prone to error can be protected by adding error handling software to those lines while other lines of software which are less likely to have errors can be executed or evaluated without the assistance of the error handling software. In other words, some software is allowed to be executed and evaluated without the additional error handling software when that newly added software is deemed to be less error-prone.

FIG. 2 shows a simplified user interface 201 of an interactive software development environment according to one embodiment. The user interface (UI) 201 can include at least three columns of information displayed on a display device. A column of line numbers (e.g. 1, 2, 3; or S1, S2, S3) may be shown on the left side of the UI 201, where each line or statement in the source code that has been entered has an associated line number. The UI 201 can include a column 203 containing the source code entered (e.g. typed) by the programmer; this source code can also include error handling expressions that have been added by the software development environment as described herein. The UI 201 can also include a results column 205 that displays the results of a REPL evaluation for the corresponding statement (e.g. the result of statement S1 is 1 and the result of statement S2 is 3, etc.). In one embodiment, the software development environment 101 in FIG. 1 can cause the display of the UI 201 on a display device and the source code editor 105 can receive and display the entered source code in column 203. The REPL operation processing logic 107 can generate the results shown in results column 205. Each time a programmer enters a line or statement in the UI 201 (e.g. the programmer types the line and presses the "Enter" Key), the source code editor 105 can send the newly entered line or statement to the source code transformer 106 which adds the one or more error handling expressions to the line or statement and then provides the modified line or statement to the REPL operation processing logic 107. If an error is generated, the UI 201 can be updated to display at least one of the added error handling expressions through the operation of error handling component 109 which causes the addition of one or more error handling expressions into the source code being processing by the source code editor 105. In the example shown in FIG. 2, the source code statements contain no errors and these statements can be fully evaluated in the REPL environment to cause the display of the results in the results column 205, and these evaluations can be done and the results displayed without compiling the entered source code.

In one embodiment, the user interface 201 can resemble the user interface of the Xcode software development environment from Apple Inc. of Cupertino Calif. The interactive software development environment can allow the programmer to enter source code and can cause the system to display evaluated results in a column adjacent to the source code so that a programmer can see the result of the evaluation of each line or statement as the line or statement is entered.

FIG. 3 shows an example of the use of an interactive software development environment that can be provided by the environment 101 shown in FIG. 1 and can use the user interface 201 shown in FIG. 2. In the example shown in FIG. 3, there is a column of multiple statements, including a first statement 301, a second statement 303, and third statement 305. In one embodiment, each of these statements can be a single line of source code which is entered by the programmer into the interactive software development environment. As shown in FIG. 3 by the timeline 307, the statements are entered sequentially over time with the first statement 301 being first in time, the second statement 303 being second in time, and the third statement 305 being last in time as shown in FIG. 3. In one embodiment, the interactive software development environment can include REPL processing logic that can generate results of the evaluation of the statements that have been entered as well as saving states of the variables and other information in the previously entered statements so that those states can be used for subsequent evaluation of new source code statements, such as new lines of source code. Column 309 represents the "in memory" evaluation results which can be produced by a REPL environment during processing of each line of code or statement of code as entered by a programmer. Column 311 represents the results which are displayed within the interactive software development environment in one embodiment. In particular, the displayed results 311 can include the results of evaluations of each statement or line as entered by the programmer during the use and development of the interactively developed computer program. In one embodiment, the REPL environment in response to entry of the first statement 301 can display the results of the evaluation of the first statement as results 316 and can also cause saving of states for the first statement as saved states 314 as shown in FIG. 3. When the programmer enters the second statement 303, the system determines that an error has prevented the evaluation of at least a portion of the second statement, and this is shown as error 318. In one embodiment, the errors are prevented from affecting previously saved states so that the REPL session can continue in the REPL environment for new statements that are added or new lines that are added such as the third statement 305. In one embodiment, the REPL environment can display the result of the evaluation of the first statement 320 as shown in FIG. 3 when errors prevent the evaluation of the second statement. After the third statement 305 is entered by the programmer, the system can compute the saved states 322 for this third statement and can display the result of the evaluation of the third statement 324 where this evaluation is based upon saved states from prior evaluations which do not depend upon variables or other data structures which are affected by error conditions from the second statement 303. The example shown in FIG. 3 can permit a programmer to continue within a REPL session in a REPL environment even though one or more lines of source code or one or more statements of source code contain content that results in error conditions or errors being generated when the statements or lines are attempted to be evaluated within the REPL environment.

FIG. 4A shows an example of a method according to one embodiment described herein. The example of FIG. 4A can be implemented with the interactive software development environment shown in FIG. 1 and can generate the presentation of a user interface as shown in the generalized form of FIG. 2. In operation 401, the interactive software development environment (IDE) can receive a line of source code; for example, the software development environment can receive a new line of source code in an interactive software development environment that is enabled with REPL processing logic such that previously submitted and executed source code has caused the saving of state information for variables and other information that can be used for the evaluation of subsequently entered source code. In one embodiment, as each line of new source code is entered, the interactive software development environment can automatically (and invisibly) add in operation 403 one or more error handling expressions to isolate errors which exist in the newly added software that is to be evaluated or otherwise executed. In one embodiment, the addition of the one or more error handling expressions can be performed by the source code transformer 106 (shown in FIG. 1). Examples of such error handling expressions (e.g. curly braces) are described further below. After the one or more error handling expressions have been added for a new line of source code, operation 405 can be performed. In operation 405, each new line of source code is evaluated in the REPL session to determine if it can be evaluated without causing errors in the REPL environment.

In one embodiment, operation 405 can be performed by the REPL operation processing logic 107 (shown in FIG. 1); if the new line of source code can be successfully evaluated by the REPL operation processing logic 107 without causing any errors, the result(s) can be displayed (e.g., in results 115 in FIG. 1) and REPL states can be saved in saved state information 111 (in FIG. 1). The successful evaluation of the new line of source code can be determined in operation 407 of FIG. 4A, and this successful evaluation causes the method of FIG. 4A to proceed to operation 409. In operation 409, the interactive software development environment can prepare to receive and execute (e.g., evaluate) the next line of entered code in the context of all of the previous lines of entered code that were successfully executed (e.g., evaluated). For example, in the case of the interactive software development environment 101 shown in FIG. 1, any error handling expressions added in operation 403 that isolate the line (or statement) of source code evaluated in operation 405 will not be added (by source code transformer 106) into the source code maintained by source code editor 105 (for successfully executed lines) and hence lines of source code added after the line (or statement) just evaluated in operation 405 can be evaluated in the context of all of the prior lines of source code that were successfully executed (e.g., evaluated). FIGS. 4B and 4D show examples of how the error handling expressions are either added or not added to allow for the use of the context of the successfully executed lines while isolating those prior lines that were not successfully executed. If operation 407 determines that the attempted evaluation of the new line (in operation 405) produced any errors, processing proceeds in the method of FIG. 4A to operation 411 instead of operation 409. In operation 411, the interactive software development environment adds the one or more error handling expressions (e.g., braces, or "do" with braces, etc.) into (e.g., around) the line (or statement) that produced the error(s) in order to isolate that line (with the error(s)) from future lines of source code so that the context of that line is not available to the future lines which can then still be evaluated. Also in operation 411, the one or more error handling expressions which were added in operation 411 can be displayed on a display device in the source code so that the programmer can see those expressions (which can be highlighted in a color that is different than the color of the source code entered by programmer) so that the programmer's attention can be drawn to that line to attempt to fix the error(s) in that line. In the example of the interactive software development environment 101 shown in FIG. 1, operation 411 can be performed by operations, as explained above, of the REPL operation processing logic 107, the error handling component 109, the source code transformer 106 and the source code editor 105; these operations are invoked when the logic 107 indicates an error (in the currently evaluated line) to error handling component 109 which in turn requests the source code transformer 106 to request the source code editor 105 to modify the source code of that line maintained by the editor 105 to add the error handling expressions to isolate the error containing line from subsequently added lines of source code. After operation 411, processing for the method shown in FIG. 4A can continue in operation 415. In operation 415, the interactive software development environment continues to receive new lines of source code that will be isolated from the context of the failed lines of source code but those new lines will have access to the context of all previous successfully executed lines of source code. Operation 415 reverts back to operation 401 as shown in FIG. 4A. The method of FIG. 4A can repeat over time as each new line is entered, evaluated and then isolated as needed to allow a programmer to test out interactively the source code even if errors are contained in one or more lines of such source code.

FIG. 4B shows an example of error handling expressions that can be added before and after evaluation of a new line of source code. In one embodiment, the additions can be performed by the interactive software development environment 101 shown in FIG. 1. These expressions can be context isolating expressions that already exist in known programming languages such as Swift. These expressions can isolate the programmatic context of the error inducing lines or statements (e.g., those lines can be wrapped or enclosed by the expressions) so that subsequently added lines can still be evaluated in the REPL session. For example, expressions such as curly braces ("{ }") or "do" statements with curly braces or "do" statements with curly braces and a "catch" statement can be used in one embodiment. These expressions can add a new scope in which variables and constants in a statement are declared within the new scope and those variable and constants can be accessed only within that new scope; this can limit the context of new line to just the new scope and shield future lines and statements from the error(s) in the isolated line. In the example of FIG. 4B, statements 421, 423, and 439 are added over time in a REPL environment (e.g., interactive software development environment 101). Prior to a first evaluation of the statement S2 (statement 423), error handling expressions can be added, by for example source code transformer 106, to wrap the statement S2 423. Thus, curly braces 425, 429, 427 and 431 can be added as shown in FIG. 4B before the first evaluation of S2. If statement S2 fails in its evaluation and then S3 is added, then curly braces 435 and 437 are added prior to evaluation of statement S3 (statement 439) and the curly brace 431 is retained and added into the source code maintained by a source code editor such as source code editor 105 in one embodiment. On the other hand, if statement S2 does not produce any errors (and hence succeeds) and statement S3 is added, then source code in the source code editor will not include the curly brace 431 (the closing curly brace for statement S2) so that statement S3 can use the context of statement S2 and the context of S1 when evaluating statement S3. The opening curly brace 435 and the closing curly brace 441 for statement 439 are added prior to evaluation in the REPL environment.

FIGS. 4C and 4D show another example of a user interface of an interactive software development environment and an internal representation, in the environment, of the isolation of a programmatic context of a line or statement of source code in the environment. In FIG. 4C, a column 461 of line numbers shows the line number of a corresponding line of source code in code column 463, and a results column 465 shows results for the corresponding line of source code. For example, source code 471 in line S5 has a result of 6 in the results column 465. The source code in line S4 includes an entry 467 that causes an error 469 in the results column 465 when the source code in line S4 is evaluated. In the example shown in FIG. 4C, lines S1, S2, S3, and S5 can be evaluated without causing any errors but line S4 includes an expression (entry 467) that causes one or more errors that prevent the successful evaluation of line S4 of source code which results in the error message in the results column 465. FIG. 4D shows an example, from a context perspective of the statements S1, S2, S3, S4 and S5, how error handling expressions can be added, based on the error(s) in statement S4, to isolate the error(s) in statement S4 from effecting subsequent statements such as S5. Error handling expressions, such as curly braces 467A and 467B, can be added around statement S4 in the UI of FIG. 4C to draw the programmer's attention to the error in statement S4. The internal representation 472 shown in FIG. 4D shows how statement S5 still has access to the programmatic context of statements S1, S2 and S3 but is isolated from the context of statement S4 which produces one or more errors. Thus, the isolation of statement S4 allows the successful evaluation of statement S5 and subsequent source code statements. The closing brace 476B for statement S4 and the opening brace 476A for statement S4 ensure the isolation of the scope of the statement S4 so that statement S5 and subsequent source code statements are isolated from the context of statement S4 which would otherwise terminate the REPL session in the REPL environment. Because statement S4 produced an error when evaluated, the opening brace 476A and the closing brace 476B were retained in the programmatic context of the REPL environment shown by internal representative 472. The opening curly braces 473A, 474A, 475A, and 477A are part of the programmatic context of statements S1, S2, S3 and S5 respectively and the closing curly braces 473B, 474B, 475B, and 477B are part of the programmatic context of statements S1, S2, S3 and S5 respectively. When statement S4 fails to successfully execute, the curly braces 476A and 476B are added into the source code so that subsequent statements, such as statement S5, are isolated from the context of statement S4.

FIGS. 4E and 4F show another example of the addition of error handling expressions to isolate a line (or set of lines that can be considered a statement that can be evaluated in a REPL environment) from subsequently added lines of source code in the environment. In FIG. 4E, a statement that defines the variable y includes an expression ("fail( )") that will cause an error when the statement is evaluated. FIG. 4F shows an example of a set of error handling expressions that can be used to isolate that statement. The error handling expression shown in FIG. 4F includes a "do" statement and associated opening and closing braces along with a "catch" statement and its opening and closing braces. Together these form an error handling expression that can prevent a REPL session in a REPL environment from terminating as a result of an error that occurs when evaluating the statement, and this error handling expression, once added into the source code in the source code editor can isolate the statement containing the error(s) from subsequent source code statements. The "do" statement and its associated braces can introduce a new scope in the source code, and variables and constants declared in that scope can be accessed only within that scope and thus subsequent statements can be isolated from errors caused by the isolated statement while still being able to access the context of prior successfully executed statements.

Figure 5:
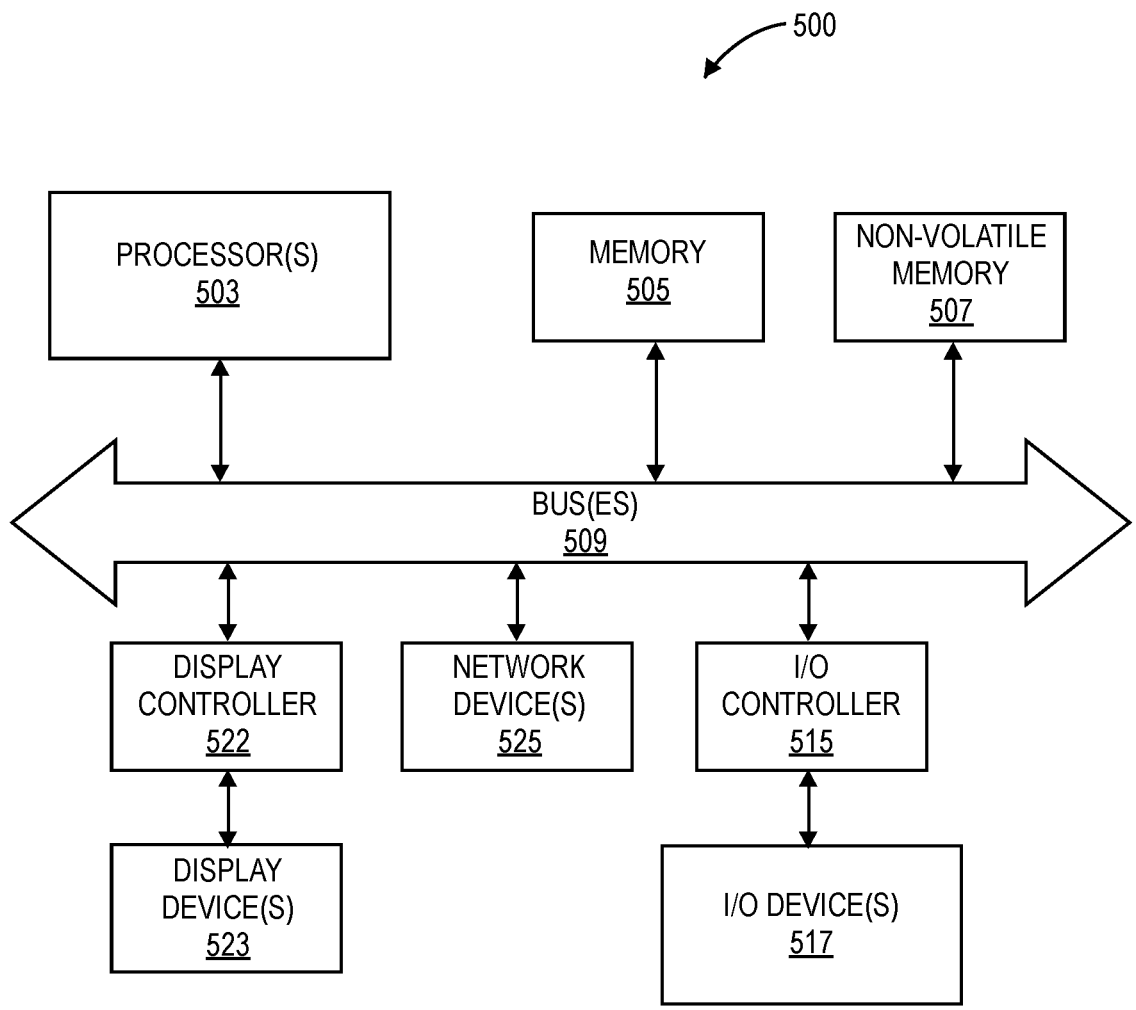
FIG. 5 is a block diagram illustrating a data processing system which can be used with one or more of the embodiments described herein.

FIG. 5 is a block diagram of a data processing system 500 according to an embodiment. Note that while FIG. 5 illustrates the various components of a data processing system that may be incorporated into a laptop computer or desktop computer or a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments. The data processing system 500 can provide the software development environment 101 shown in FIG. 1.

The data processing system 500 includes one or more bus(es) 509 that serve to interconnect the various components of the system. One or more processor(s) 503 are coupled to the one or more bus(es) 509 as is known in the art. Memory 505 may be volatile DRAM or non-volatile RAM, such as NOR flash memory or other types of high-speed, non-volatile, execute-in-place memory. This memory can be coupled to the one or more bus(es) 509 using techniques known in the art. The data processing system 500 can also include explicitly non-volatile memory 507, such as data storage devices including one or more hard disk drives, flash memory devices or other types of memory systems that maintain data after power is removed from the system. The non-volatile memory 507 and the memory 505 can each couple to the one or more bus(es) 509 using known interfaces and connection techniques. A display controller 522 can couple to the one or more bus(es) 509 to receive display data, which can be displayed on a display device 523. In one embodiment the display device 523 includes an integrated touch input to provide a touch screen.

The data processing system 500 can also include one or more input/output (I/O) controllers 515 which provide interfaces for one or more I/O devices 517, such as one or more mice, touch screens, touch pads, and other input devices including those known in the art and output devices (e.g. speakers). The input/output devices 517 are coupled through one or more I/O controllers 515 as is known in the art.

While the data processing system 500 illustrates the memory 505 and non-volatile memory 507 as coupled to the one or more buses directly, in one embodiment the non-volatile memory 507 can be remote from the data processing system 500, such as in a network storage device which is coupled to the data processing system through a network interface such as a modem, wireless LAN, or Ethernet interface. The bus(es) 509 can be connected to each other through various bridges, controllers and/or adapters as is well known in the art. In one embodiment the I/O controller 515 includes one or more of a USB (Universal Serial Bus) adapter for controlling USB peripherals or a Thunderbolt controller for controlling Thunderbolt peripherals. In one embodiment, one or more network device(s) 525 can be coupled to the bus(es) 509. The network device(s) 525 can be wired network devices (e.g., Ethernet) or wireless network devices (e.g., WI-FI, Bluetooth).

It will be apparent from this description that embodiments and aspects of the present invention may be embodied, at least in part, in software. That is, the techniques and methods may be carried out in a data processing system or set of data processing systems in response to the processors executing a sequence of instructions stored in a storage medium, such as a non-transitory machine readable storage media, such as volatile DRAM or nonvolatile flash memory. In various embodiments, hardwired circuitry may be used in combination with software instructions to implement the embodiments described herein. Thus the techniques and methods are not limited to any specific combination of hardware circuitry and software, or to any particular source for the instructions executed by the one or more data processing systems.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method in a data processing system, the method comprising:

receiving a first set of software in an interactive software development environment, the interactive software development environment providing a representation of one or more outputs for one or more portions in the first set of software entered into the interactive software development environment, the representation of one or more outputs provided in response to entry of the one or more portions in the first set of software that can be evaluated to produce a result;

saving first state information derived from evaluation of the first set of software in the interactive software development environment;

receiving a second set of software in the interactive software development environment, the second set of software received after receipt of the first set of software; and adding one or more error handling expressions to the second set of software to isolate error conditions produced when executing the second set of software in the interactive software development environment, the one or more error handling expressions added automatically by the interactive software development environment, wherein subsequent sets of software added after the second set of software are isolated from the results or outputs of the isolated second set of software by the automatically added error handling expressions in the event that the second set of software fails to execute successfully, wherein the interactive software development environment provides the representation of the one or more outputs before compilation of the first set of software, and wherein the interactive software development environment additionally provides the representation of the one or more outputs through a read-evaluate-print-loop functionality in the interactive software development environment.

2. The method of claim 1 wherein the one or more error handling expressions wrap the second set of software to isolate error conditions from affecting the subsequent sets of software and wherein the one or more error handling expressions are added prior to first execution of the second set of software in the interactive software development environment and wherein the method further comprises: attempting, by the interactive software development environment, evaluation of the second set of software after the addition of the one or more error handling expressions.

3. The method as in claim 2, wherein the method further comprises:

displaying, in the second set of software, at least one of the added error handling expressions in response to determining the second set of software produces an error condition when executed and wherein the added error handling expressions are not displayed, in the second set of software, if the second set of software successfully executes.

4. The method as in claim 2, wherein the method further comprises:

receiving, by the interactive software development environment, a third set of software after attempted evaluation of the second set of software and evaluating the third set of software using the saved first state, the third set of software being part of the subsequent sets of software.

5. The method as in claim 4 wherein error conditions produced by the second set of software do not prevent the evaluation of the third set of software and wherein the subsequent set of software executes using a programmatic context of the first set of software but not the second set of software in the event that the second set of software fails to execute successfully by creating one or more errors and wherein the subsequent set of software executes using the programmatic context of the first and the second sets of software in the event that the first and the second sets of software execute successfully without creating one or more errors.

6. The method as in claim 1, wherein the method further comprises:

adding the one or more error handling expressions to the first set of software to isolate error conditions when executing the first set of software, the one or more error handling expressions added automatically by the interactive software development environment prior to first execution of the first set of software in the interactive software development environment.

7. The method as in claim 1 wherein one or more error handling expressions are added for each line of software as it is entered into the interactive software development environment.

8. The method as in claim 1 wherein the one or more error handling expressions comprising the one or more symbols or characters or keywords that already exist in a programming language to isolate a set of software in its own programmatic context from the programmatic context of other software.

9. The method as in claim 1 wherein the one or more error handling expressions are not compiled when the second set of software is compiled in the interactive software development environment.

10. A non-transitory machine readable medium storing executable program instructions which when executed by a data processing system cause the data processing system to perform a method comprising:

receiving a first set of software in an interactive software development environment, the interactive software development environment providing a representation of one or more outputs for one or more portions in the first set of software entered into the interactive software development environment, the representation of one or more outputs provided in response to entry of the one or more portions in the first set of software that can be evaluated to produce a result;

saving first state information derived from evaluation of the first set of software in the interactive software development environment;

receiving a second set of software in the interactive software development environment, the second set of software received after receipt of the first set of software; and adding one or more error handling expressions to the second set of software to isolate error conditions produced when executing the second set of software in the interactive software development environment, the one or more error handling expressions added automatically by the interactive software development environment, wherein subsequent sets of software added after the second set of software are isolated from the results or outputs of the isolated second set of software by the automatically added error handling expressions in the event that the second set of software fails to execute successfully, wherein the interactive software development environment provides the representation of the one or more outputs before compilation of the first set of software, and wherein the interactive software development environment additionally provides the representation of the one or more outputs through a read-evaluate-print-loop functionality in the interactive software development environment.

11. The medium of claim 10 wherein the one or more error handling expressions wrap the second set of software to isolate error conditions from affecting the subsequent sets of software and wherein the one or more error handling expressions are added prior to first execution of the second set of software in the interactive software development environment and wherein the method further comprises: attempting, by the interactive software development environment, evaluation of the second set of software after the addition of the one or more error handling expressions.

12. The medium as in claim 11, wherein the method further comprises:

displaying, in the second set of software, at least one of the added error handling expressions in response to determining the second set of software produces an error condition when executed and wherein the added error handling expressions are not displayed, in the second set of software, if the second set of software successfully executes.

13. The medium as in claim 11, wherein the method further comprises:
receiving, by the interactive software development environment, a third set of software after attempted evaluation of the second set of software and evaluating the third set of software using the saved first state, the third set of software being part of the subsequent sets of software.

14. The medium as in claim 13 wherein error conditions produced by the second set of software do not prevent the evaluation of the third set of software and wherein the subsequent set of software executes using a programmatic context of the first set of software but not the second set of software in the event that the second set of software fails to execute successfully by creating one or more errors and wherein the subsequent set of software executes using the programmatic context of the first and the second sets of software in the event that the first and the second sets of software execute successfully without creating one or more errors.

15. The medium as in claim 10, wherein the method further comprises:
adding the one or more error handling expressions to the first set of software to isolate error conditions when executing the first set of software, the one or more error handling expressions added automatically by the interactive software development environment prior to first execution of the first set of software in the interactive software development environment.

16. The medium as in claim 10 wherein one or more error handling expressions are added for each line of software as it is entered into the interactive software development environment.

17. The medium as in claim 10 wherein the one or more error handling expressions comprising one or more symbols or characters or keywords that already exist in a programming language to isolate a set of software in its own programmatic context from the programmatic context of other software.

18. The medium as in claim 10 wherein the one or more error handling expressions are not compiled when the second set of software is compiled in the interactive software development environment.

* * * * *